July 26, 1960

G. SOTEROPULOS 2,946,169

FIELD FORAGE HARVESTER

Filed May 2, 1957

INVENTOR.
G. SOTEROPULOS

July 26, 1960

G. SOTEROPULOS 2,946,169

FIELD FORAGE HARVESTER

Filed May 2, 1957

INVENTOR.
G. SOTEROPULOS

United States Patent Office 2,946,169
Patented July 26, 1960

2,946,169
FIELD FORAGE HARVESTER

Gust Soteropulos, Ottumwa, Iowa, assignor, by mesne assignments, to Deere & Company, a corporation of Delaware Filed May 2, 1957, Ser. No. 656,694

6 Claims. (Cl. 56—16)

This invention relates to a field forage harvester and more particularly to a harvester of the type utilizing a crop-severing and -reducing rotor which delivers to an auger which in turn delivers to a crop-receiving housing.

Forage harvesters of the general character referred to have attained recent popularity because of their simplicity and further because of the fact that they combine the crop-severing action with the crop-reducing action, thus rendering the crop sufficiently finely reduced to enable handling thereof by a paddle-wheel type of blower for ultimate delivery to a receiving vehicle. However, machines of this character have certain inherent deficiencies, particularly in the handling of crops which are ultimately ensiled, because the lack of uniformity of cut, while immaterial in many situations, prevents proper ensiling because relatively long pieces of crop preclude proper compaction. To secure the necessary fine reduction, it is necessary to further reduce the crops in another machine.

According to the present invention, this difficulty is overcome by the provision, in a field forage harvester of the character noted, of a combination blower and chopper type flywheel having chopper elements cooperative with a shear bar at the discharge end of the transfer auger, whereby the chopped and severed crops handled by the rotor and delivered to the chopper and blower housing are additionally reduced, thus eliminating the long pieces that heretofore interfered with proper ensiling. It is a further object of the invention to provide a novel form of shear bar at the delivery end of an auger or conveyor for cooperation with chopper elements on the chopper flywheel, and preferably to form the shear bar of two sections, one of which is straight and the other of which is curved. A further feature resides in providing the shear bar in two separate pieces, each of which is symmetrical so that it enables reversal of the parts without resharpening, thereby doubling the life thereof. Still further objects reside in co-ordinating the directions of rotation of the auger and flywheel with the shape of the shear bar or equivalent means forming a transfer junction between the trough and the blower housing so that the material is compelled to pass the junction in a shearing zone enabling efficient cooperation between the shear bar or shear portion and the chopper elements on the combined chopper and blower flywheel.

The foregoing and other important objects and desirable features inherent in and encompassed by the invention will become apparent as a preferred embodiment thereof is disclosed in detail in the ensuing specification and accompanying sheets of drawings, the several figures of which are described immediately below.

The harvester comprises a mobile frame 10 carried on right and left hand wheels 11 and 12 for advance over a field of crops by means of a tractor or other propelling vehicle (not shown) the draft connection to which is effected by a draft tongue 13. Power for driving the components of the machine is derived from the tractor, as via a power take-off, through a propellor shaft 14. These and other general characteristics of the machine are similar to those disclosed in assignee's copending application Ser. No. 468,349, filed November 12, 1954, now Pat. No. 2,795,913 and familiarity with the over-all structure will therefore be assumed.

Figure 1:
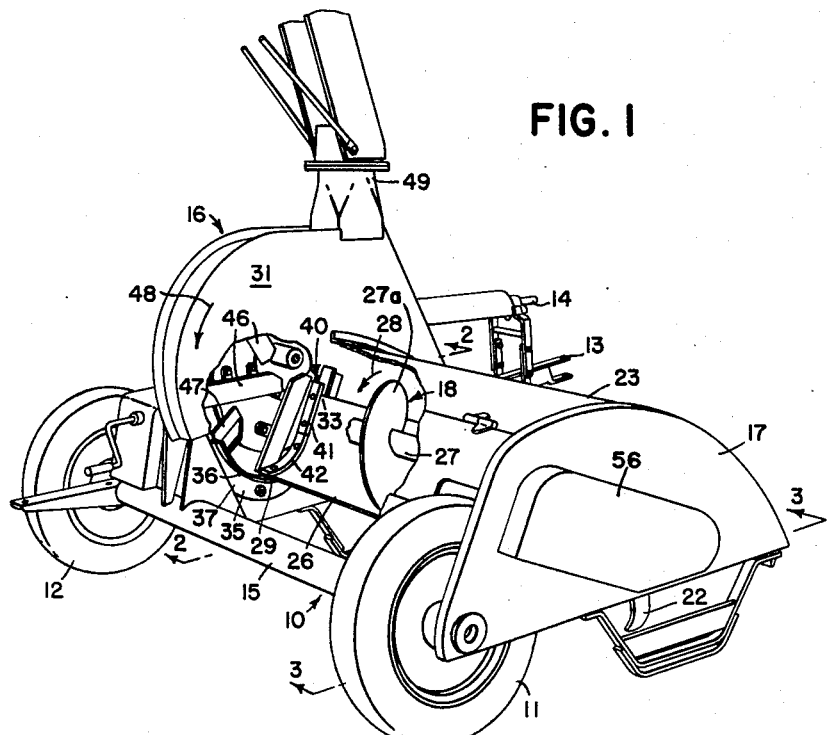
Fig. 1 is a perspective of the harvester, with casing and housing portions broken away to reveal the interior mechanism.

The frame 10 includes a transverse axle 15 which supports at one end a combined blower and chopper housing 16 and which supports at its outer end a fore-and-aft panel and support 17. Conveyor means 18 extends transversely between the panel 17 and the housing 16 and ahead of the conveyor means is crop-collecting and -reducing means 19. This means comprises a rotor 20 including a central shaft 21 transverse to the line of advance and carrying a plurality of flail-like arms 22 which operate beneath a confining casing or hood 23 of inverted U shape. The direction of rotation of the rotor is indicated by the arrow 24, from which it will be seen that the arms sweep downwardly and circumferentially forwardly to sever crops from the ground, at the same time reducing the crops. As rotation continues, the arms sweep upwardly and rearwardly beneath the hood or casing 23 and cause the crops to depart from the cylinder of rotation in a rearward direction as indicated by the arrow 25. From this zone, the crops enter the conveyor 18, which conveyor means is shown as an auger trough 26 of typical trough shape which supports an auger 27 at its outer end. The rear portion of the housing or hood 23 and its relation to the trough 26 gives this structure a generally C-shaped configuration in section, the auger having a bottom 26a, a rear wall 26b and a front wall 26c. The front wall is generally straight and inclines upwardly and forwardly, terminating in a transverse edge 26d. The rear wall curves forwardly into the hood 23 so that a portion of the hood serves as an extension 26e of this wall to overhang the edge 26d so as to afford a space 26f through which chopped crops are delivered to the trough, following the arrow 25. The auger rotates in the direction of the arrow 28, and the upper portions 27a of the flights thus move downwardly past the rear wall 26b, forwardly over the bottom 26a and upwardly at the front wall 26c, at the same time of course moving the crops axially to the left. The closed end of the auger trough 26 is adjacent to the panel 17 and the opposite end of the trough affords a discharge end or opening generally indicated by the numeral 29. The auger is substantially coterminous with the trough 26 and has its terminal delivery end 30 closely proximate to the adjacent wall 31 of the blower and chopper housing 16 (Fig. 4), wherein the terminal end of the auger appears simply as a straight-line. The terminal portion of the auger 27 is broken away in Fig. 1 to reveal the junction between the trough 26 and the proximate wall 31 of the housing 16.

Figure 2:
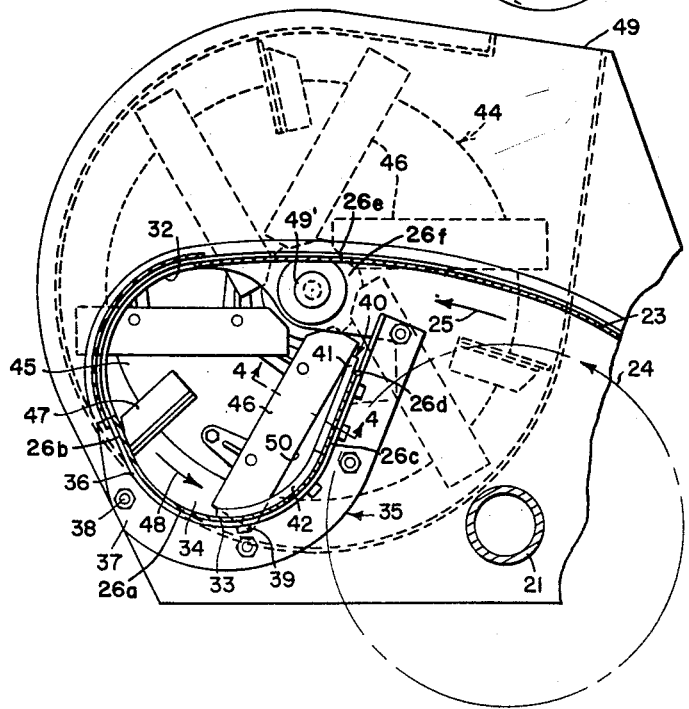
Fig. 2 is an enlarged section generally on the line 2—2 of Fig. 1.
Figure 3:
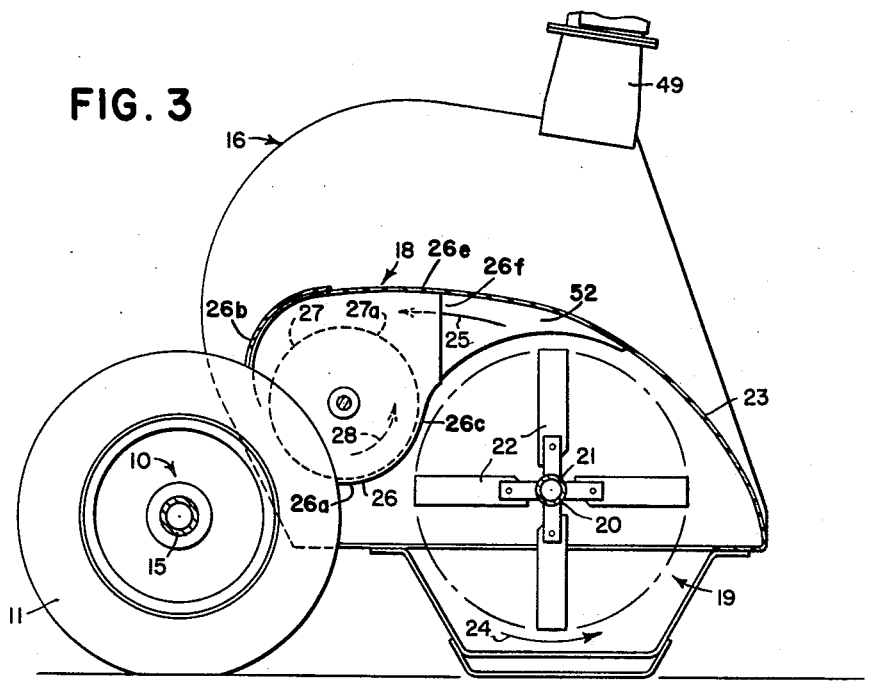
Fig. 3 is an end elevation, on an enlarged scale and partly in section as seen with the outer panel removed, the plane of the section being indicated roughly by the line 3—3 in Fig. 1.
Figure 4:
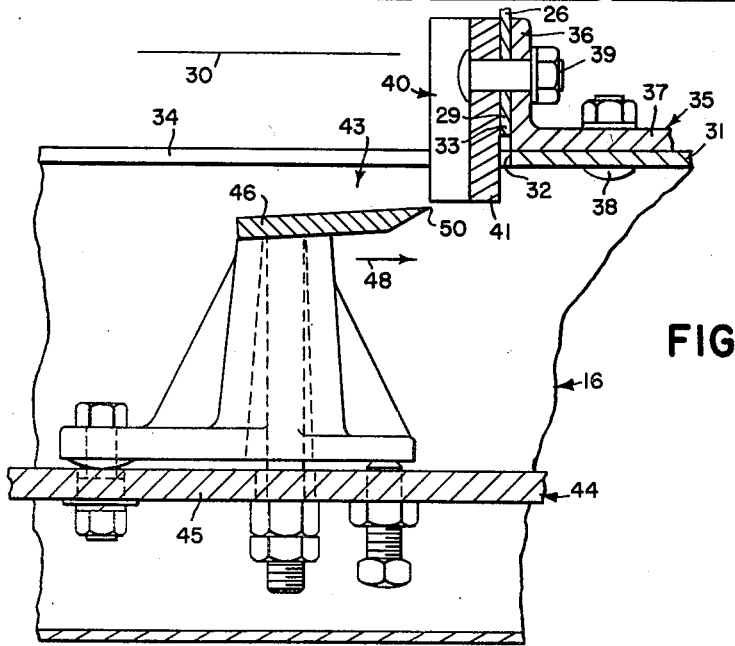
Fig. 4 is an enlarged fragmentary section as seen along the line 4—4 of Fig. 2.

The wall 31 has an inlet opening 32, portions of the wall defining this opening cooperating with adjacent portions 33 of the trough to afford a crop-transfer junction 34 across which the auger 27 forces crops to move into the housing 16. As best shown in Figs. 2 and 4, the inner end 29 of the auger trough 26, which includes the junction-affording portions 33, is arcuate and is supported on a supporting member 35 which has generally a J-shape and which in section is L-shaped, thus affording first and second flanges 36 and 37, the first of which is arcuate to conform in part to the shape of the trough 26 and the other of which lies flatwise against the external side of the wall 31. Fasteners, such as at 38, secure the flange 37 to the wall 31. The other flange 36 externally embraces the proximate portion of the auger trough 26 and fasteners, such as at 39, accomplish the mounting of the trough on the member 35.

The member 35 at the junction 34 affords another purpose, in that it carries a shear bar 40 which is here shown as being made up of two pieces, one a straight piece 41 and the other an arcuate piece 42, the two pieces affording a continuous shear bar which lies along a curved portion of the trough and a straight portion of the trough at the junction 34. The disposition or angle of the straight portion or piece 41 of the shear bar 40 is significant, as will be brought out below.

From the description thus far, it will be seen that the rotor 20 severs crops from the field, reduces the crops at the same time, and compels them to travel rearwardly in the direction of the arrow 25 to be received by the auger trough 26, whence the auger 27 moves them across the crop-transfer zone 34 as indicated by the arrow 43 in Fig. 4. As the crops are transferred in this direction, they pass the junction 34 and particularly pass across the shear bar 40. The housing 16 carries a combined chopper and blower flywheel 44 comprising a basic rotor 45 on which is mounted a plurality of chopper elements 46 and blower paddles 47. The flywheel 44 rotates in the direction of the arrow 48 and the paddles 47 serve to expel the crops tangentially and upwardly through a discharge stack 49, to which extent the machine may be considered conventional. However, the interposition of the chopper elements 46 and shear bar 40 materially improve the operation of the machine and afford a result not heretofore achieved.

As best seen in Fig. 2, the chopper elements or knives 46 are disposed generally radially as respects the axis of the flywheel 45, which axis is designated as being coincident with a flywheel-supporting bearing 49'. Actually, the leading edge 50 of each knife 46 is parallel to a radius of the flywheel so that when a particular knife 46 approaches the position shown in Fig. 2 in relation to the shear bar 40, the leading edge is in radially outwardly diverging relation to the shear bar, whereby an improved shearing action is obtained. Thus, the crops, in addition to being severed and reduced by the rotor 20, are additionally reduced by the chopper knives 46 and the cooperation between the knives and the shear bar 40.

The purpose of making the shear bar 40 in the two pieces 41 and 42 is that each of the pieces is symmetrical and may be removed, reversed and replaced so that the life thereof is doubled without the sharpening. In reversing the members, they are changed end for end. The straight piece may also be turned over and hence may be used four times without resharpening.

In the particular construction shown, the flywheel 44 has six knives and three paddles; although, these could be varied to suit individual desires. The greater number of knives affords a relatively shorter cut of the material and thus improves the material for compaction so that it may be ensiled without spoilage. Another feature is the rotation of the auger in the direction of the arrow 28, which is generally the same as the direction of rotation 48 of the flywheel, whereby the material is forced upwardly and along the shear bar 40 to ensure that it is sheared without too much overflow of unsheared material into the housing 16. Of course, material being contacted by the knives within the housing will be cut to some extent but the primary shearing action occurs at 40—50, because it is at this point that the length of cut can be regulated. For example, the type of flywheel structure involving the plate 45 and the knives 46 means that long pieces of stalks, for example, can enter the housing 16 only until they are stopped by the plate 45, thus assuring a maximum length of cut. As will be seen, this maximum length in this particular case is relatively short, which is ideal for forage intended for ensiling.

Features of the invention not categorically enumerated will undoubtedly occur to those versed in the art, as will many modifications and alterations in the preferred embodiment disclosed, all of which may be achieved without departure from the spirit and scope of the invention.

What is claimed is:

1. In a field forage harvester having a mobile frame carrying an elongated conveyor trough including a discharge end and a conveyor in the trough for moving crops past said discharge end, the improvement comprising: a crop-receiving housing on the frame and having a wall transverse to the length of the trough at the discharge end thereof, said wall having a crop inlet opening in register with said discharge end and portions of said wall defining said opening and portions of said trough defining said discharge end combining to afford a crop-transfer junction between the trough and housing across which the conveyor moves crops into said housing; and a combined chopper and blower fly wheel rotatable in the housing on an axis substantially parallel to the rotor axis and including at least one chopper element movable in a radial chopping plane past and in crop-shearing relation to said junction to chop crops transferred across said junction, said chopper element having a leading edge and being positioned on the fly wheel with said edge generally parallel to a radius of said fly wheel, and said junction being generally U-shaped, having a curved lower shear portion and further having a straight shear portion extending upwardly from said curved portion, said portions being cooperative with said cutting edge as said element passes said junction, said straight portion including a straight shearing edge diverging radially outwardly as respects said leading edge when said leading edge approaches said shearing edge whereby to afford a shearing action between said edges.

2. The invention defined in claim 1, including: a shear bar of two-piece construction mounted at said junction, one piece being curved and constituting said curved portion and the other piece being straight and constituting said straight portion, and said straight piece being removably mounted at said junction and further being symmetrical end for end so as to be reversible in position and having opposite shearing edges alternately cooperative with the blade.

3. The invention defined in claim 1, including: a shear bar of two-piece construction mounted at said junction, one piece being curved and constituting said curved portion and the other piece being straight and constituting said straight portion and said curved piece being removably mounted at said junction and further being symmetrical end for end so as to be reversible in position and having opposite shearing edges alternately cooperative with the blade.

4. The invention defined in claim 1, including: a shear bar of two-piece construction mounted at said junction, one piece being curved and constituting said curved portion and the other piece being straight and constituting said straight portion, said straight piece being removably mounted at said junction and further being symmetrical end for end so as to be reversible in position and having opposite shearing edges alternately cooperative with the blade and said curved piece being also removably mounted at said junction and further being symmetrical end for end so as to be reversible in position and having opposite shearing edges alternately cooperative with the blade.

5. A field forage harvester, comprising: a mobile frame; an elongated frame-carried rotor rotatable on an axis crosswise of the line of advance and having flail-like arms adapted to sweep downwardly and circumferentially to sever and preliminarily reduce crops and then to sweep upwardly and rearwardly to lift the severed and reduced crops for ultimate rearward transfer; an elongated auger trough behind and generally coterminous with the rotor and having a generally coaxial discharge end; a hood of substantially inverted U-shaped section overlying the rotor and auger trough for confining the lifted crops to travel rearwardly into the auger trough; a crop-receiving housing on the frame and having a wall transverse to the length of the trough at the discharge end thereof, said wall having a crop-inlet opening substantially in coaxial register with said discharge end and portions of said wall defining said opening and portions of said trough defining said discharge end combining to afford a crop-transfer junction between the trough and housing; an auger generally coaxial with the trough and movable therein to move trough-received crops to and across said junction and into the housing; a combined chopper and blower flywheel rotatable in the housing on an axis substantially parallel to the auger axis and including at least one chopper element movable in a radial chopping plane past and in crop-shearing relation to said junction to further chop and reduce crops transferred across said junction said element having a leading cutting edge generally parallel to a radius of said flywheel; and said junction including a shear bar cooperative with said cutting edge as said element passes said junction, said bar having an arcuate extension following in part the shape of the bottom of the trough proximate to said junction and a straight shearing edge diverging radially outwardly as respects said leading edge when said leading edge approaches said shearing edge whereby to afford a shearing action between said edges.

6. The invention defined in claim 5, in which: the shear bar is of two-piece construction, including a first straight piece providing said straight shear portion and a second piece providing said arcuate extension.

References Cited in the file of this patent

UNITED STATES PATENTS

| | | |
|---|---|---|
| 2,661,585 | Hansen | Dec. 8, 1953 |
| 2,725,704 | Skromme | Dec. 6, 1955 |
| 2,777,268 | Breed | Jan. 15, 1957 |
| 2,795,912 | Skromme | June 18, 1957 |
| 2,795,913 | Skromme et al. | June 18, 1957 |
| 2,847,811 | Martin et al. | Aug. 19, 1958 |